2 Sheets—Sheet 1.

J. M. POOLE.

Assignor to himself, W. T. PORTER and T. S. POOLE.

Machine for Grinding Objects Cylindrically.

No. 7,978. Reissued Dec. 4, 1877.

Witnesses:

Geo. H. Graham.

L. W. Sloat.

Inventor;

J. Morton Poole, by Chas. W. Forbes

Attorney.

2 Sheets—Sheet 2.

J. M. POOLE.

Assignor to himself, W. T. PORTER and T. S. POOLE.

Machine for Grinding Objects Cylindrically.

No. 7,978. Reissued Dec. 4, 1877.

Witnesses;
Geo. H. Graham.
L. W. Sloat.

Inventor:
J. Morton Poole,
by Chas. W. Forbes
Attorney.

UNITED STATES PATENT OFFICE.

J. MORTON POOLE, OF WILMINGTON, DELAWARE, ASSIGNOR TO HIMSELF, WILLIAM T. PORTER, AND THOMAS S. POOLE, OF SAME PLACE.

IMPROVEMENT IN MACHINES FOR GRINDING OBJECTS CYLINDRICALLY.

Specification forming part of Letters Patent No. 99,000, dated January 18, 1870; Reissue No. 7,978, dated December 4, 1877; application filed October 10, 1877.

*To all whom it may concern:*

Be it known that I, J. MORTON POOLE, of the city of Wilmington, in the county of New Castle and State of Delaware, have invented a new and Improved Machine for Grinding Objects Cylindrically; and I do hereby declare that the following is a full, clear, and exact description thereof, reference being had to the accompanying drawings, forming a part of this specification, in which—

Figure 1:
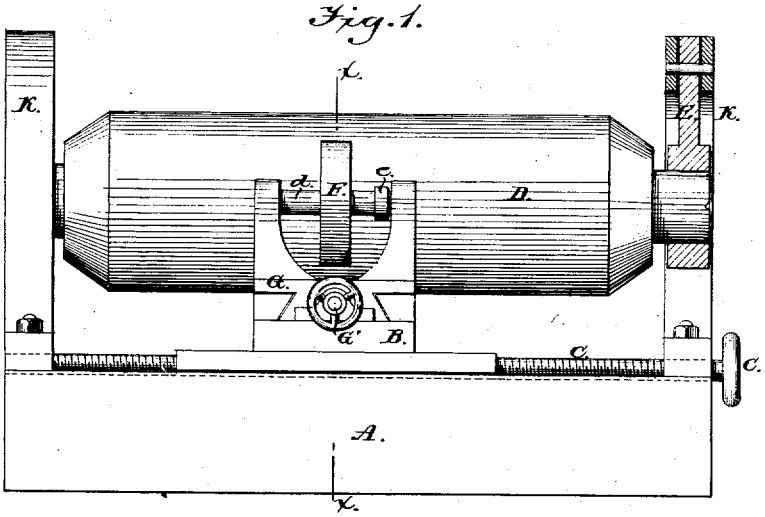
Figure 2:
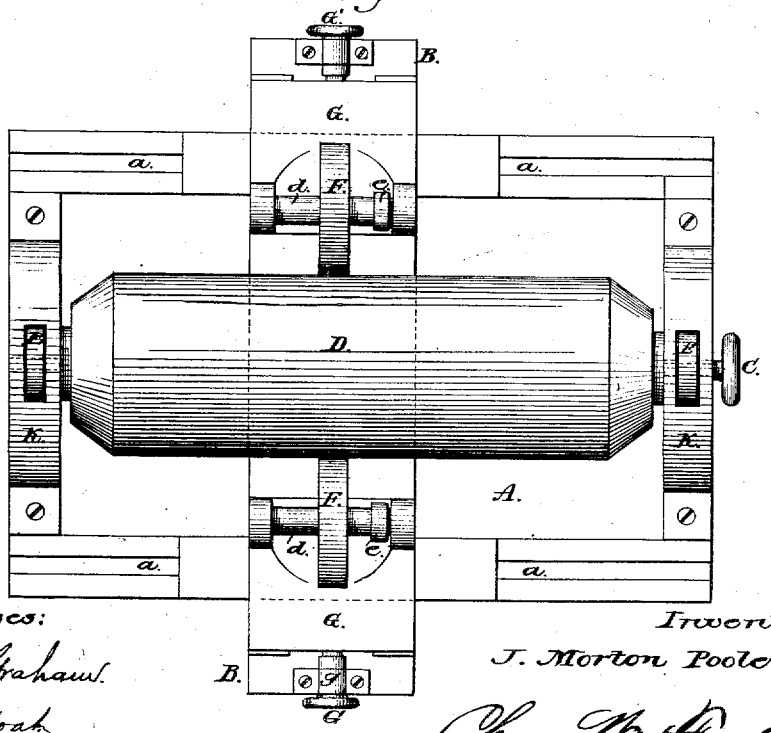

Figure 1 represents a side elevation, partly in section; Fig. 2 a plan view, and Fig. 3 a transverse section taken on the line *x x*, Fig. 1, of a machine embodying my invention.

Similar letters of reference indicate corresponding parts in the several figures.

This invention relates to a new and useful improvement, which is designed to overcome certain difficulties hitherto experienced in machines for turning or grinding objects cylindrically true.

The invention consists in supporting the object to be ground upon yielding bearings, so that it is free to move transversely to its axis when impelled by a slight force, and to revolve in contact with a traversing grinding mechanism, as will be hereinafter explained.

To enable others skilled in the art to understand and use my invention, I will proceed to describe the same.

Figure 3:
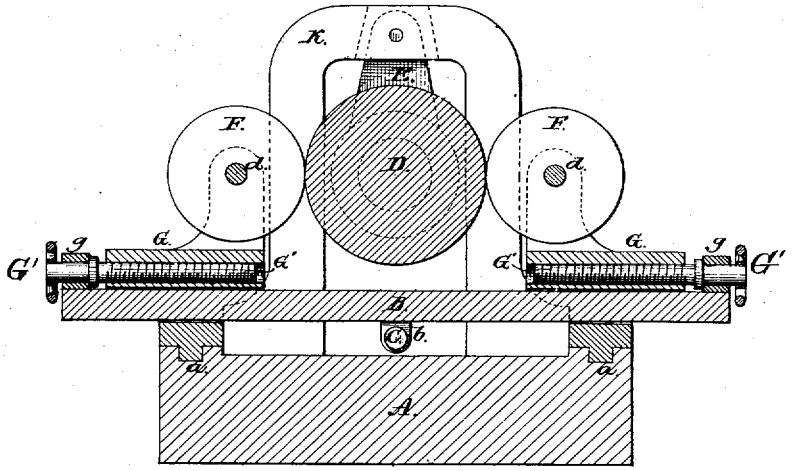

A is the horizontal bed of the machine, which may be constructed of any required length and width, and should be substantially supported upon a frame or stand somewhat after the manner of constructing the frame and bed of a turning-lathe. At or near the extremities of the bed A are bearings E E, which are designed for supporting the ends of the object D to be ground. These bearings should be so constructed that the object D can be readily introduced into the machine, and removed therefrom, and so that said object D, instead of being rigidly supported, shall be free to move transversely when impelled by a very slight force. Upon this horizontal bed A a slide-rest or saddle, B, is supported, and guided by the tenons on said rest, fitting into grooves *a a*, formed in the bed, as shown in Fig. 3. This slide rest or saddle B lies transversely across the bed, and may be moved in a direction with the length thereof by means of a screw, C, turned by hand or otherwise, which screw is tapped through an eye, *b*, upon the bottom of the rest, and supported at its ends by suitable bearings upon the bed A. F F represents grinding-wheels, which are placed on opposite sides of the axis of the object D, and upon horizontal shafts *d d*, which have their bearings in the standards of laterally-adjustable tool-rests G G, and which carry wheels or drums *e e*, around which belts pass for communicating rotary motion to the grinding-wheels.

The screws G′ G′, with their hand-wheels, are designed for adjusting and fixing the grinding-wheels at any desired distance apart, according to the required diameter of the object to be operated upon. These screws are supported by means of bearings *g g*, which are fast upon the upper surface of the horizontal transverse saddle or slide-rest B.

Instead of employing two opposite grinding-wheels, one grinding-wheel, with a suitable stop opposite to it, may be substituted.

I propose to use at the same time more than one pair of grinding-wheels, operating, with respect to the cylinder to be ground, in the same manner as the single pair operates, but one pair operating upon one portion of the cylinder while another pair is operating upon another portion. The pairs of wheels will be actuated in harmony with one another. In a word, the device of the grinding-wheels may be duplicated in the one machine, if desired, as many times as utility will demand.

The same plan of duplicating may be adopted in cases where only one grinding-wheel and an opposite stop are used. These modifications I regard as but the equivalents of the plan of construction represented in the drawings.

If the grooves *a a* on the bed A were made perfectly straight, and the object D to be ground supported in unyielding bearings, with its axis placed perfectly parallel to the line of movement of the slide-rest B, and the opposing traversing-surfaces in contact therewith maintained at a given distance apart, and the machine set in motion, it is evident that a truly cylindrical object could be produced.

In practice, however, it is impracticable to always construct the bed and its guideways perfectly straight, or to prevent the natural wear of the several parts composing the machine. The former defect will cause the slide-rest B to pursue a course out of parallel with the axis of the object, and thereby vary the pressure of the traversing devices upon the same, while the latter is a natural consequence, and will produce lost motion, and consequent irregular movements of the parts, producing a like effect.

The varying travel of the slide-rest B, when grinding objects of different lengths, will also wear the guideways irregularly.

By my invention—that is, supporting the object to be ground upon yielding bearings, so that it is free to move transversely, and instantly yield whenever the slide-rest B has a tendency to move out of parallelism with the axis of said object—it will be seen that the grinding-wheels or opposing-stops are relieved from an inequality of pressure thereon.

It will be understood that my invention is especially designed for grinding objects to a uniform diameter after the objects have seemingly to the eye, and even by the application of calipers, been turned true in a lathe in the ordinary manner.

Having thus fully described my invention, what I claim, and desire to secure by Letters Patent, is—

The combination of a traversing grinding mechanism, and yielding bearings for supporting the object to be operated upon, for the purpose specified.

J. MORTON POOLE.

Witnesses:
JAMES M. WATSON,
THOMAS MCCORKLE.